J. H. McKAY.
SECTION HONEY BOX FRAME.
APPLICATION FILED APR. 18, 1918.
1,281,619.
Patented Oct. 15, 1918.
2 SHEETS—SHEET 1.
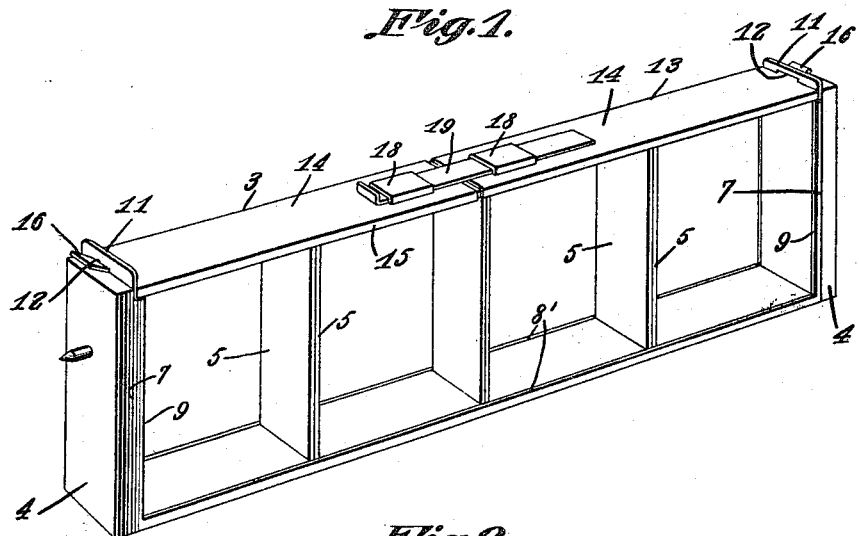
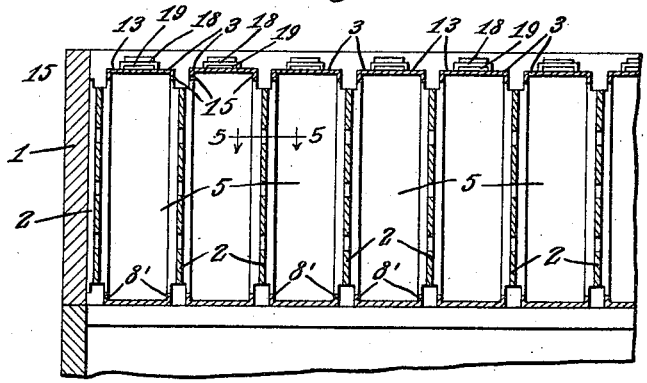

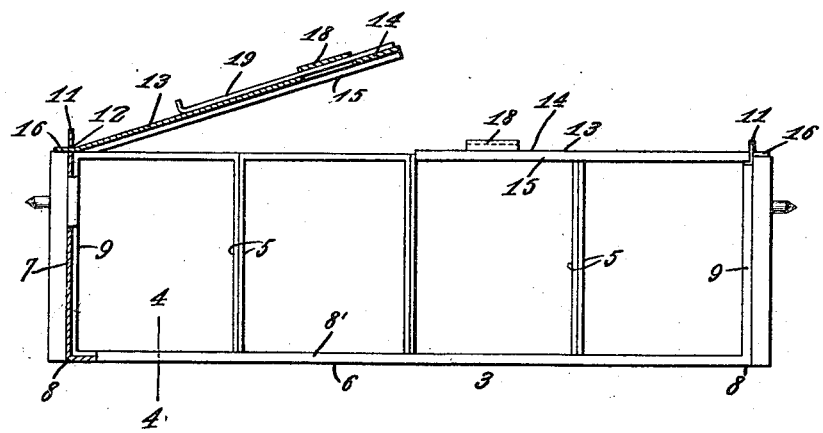

UNITED STATES PATENT OFFICE.

JAMES H. McKAY, OF FOREST CITY, IOWA.

SECTION-HONEY-BOX FRAME.

1,281,619. Specification of Letters Patent. Patented Oct. 15, 1918.

Application filed April 18, 1918. Serial No. 229,286.

*To all whom it may concern:*

Be it known that I, JAMES H. MCKAY, a citizen of the United States, residing at Forest City, in the county of Winnebago and State of Iowa, have invented a new and useful Section-Honey-Box Frame, of which the following is a specification.

This invention relates to improvements in section honey-box frames or holders for use in holding the sections of honey boxes in the super of a bee-hive, the object of the invention being to provide an improved frame of such character which is made of sheet metal, which prevents the honey boxes or sections from being gummed, which protects the honey boxes from the pressure of springs and wedges used to hold the aggregate of section holders together when the super is filled for use, and which embodies readily separable parts which allow any one or more of the honey boxes to be removed and replaced at will and without disturbing the super in general.

Another object of the invention is to provide an improved frame of this character which embodies a top bar comprising several members and means to detachably lock and secure the said members together to cause the top bar to hold the honey boxes in the frame.

Another object of the invention is to provide an improved frame of this character which enables honey boxes or sections made of paste board to be used instead of honey boxes or sections made of bass wood.

With the above and other objects in view the invention consists in the construction, combination and arrangement of devices hereinafter described and claimed.

In the accompanying drawings:

Figure 1 is a perspective view of the honey box frame or holder constructed and arranged in accordance with my invention.

Fig. 2 is a detailed sectional view of the super or upper portion of a bee-hive, showing several of my frames arranged therein, and also showing the fences which form the partition between the frames, and also showing the honey boxes in the frames.

Fig. 3 is a detailed elevation of one of the frames, partly in section, and showing the members of the top bar disconnected from each other and in the act of being removed.

Fig. 4 is a detailed sectional view on the plane indicated by the line 4—4 of Fig. 3.

Fig. 5 is an enlarged horizontal section through a portion of the structure, said section being on the line 5—5, Fig. 2 and showing portions of honey boxes in section.

For the purpose of this specification the super or upper portion of the bee-hive is indicated 1, provided with the usual fences or partition members 2 which separate the honey box frames or holders 3 and the uprights are indicated at 4.

In accordance with my invention the frame 3 which holds the honey boxes or sections 5 is made of sheet metal, preferably sheet iron and comprises a bottom bar 6, and end bars 7, which are integral with the bottom bar and which are arranged vertically and are bent from the bottom bar on the line 8. The bottom bar is formed at its opposite side edges with upwardly extending flanges 8' which correspond in the width with the thickness of the bottom side of the honey boxes or sections 5, so that the said flanges entirely cover the side edges of the bottom or lower side of the honey boxes or sections and thereby prevent the honey boxes or sections from being gummed to the bottom bar of the frame, as will be understood. The ends 7 are also formed with inwardly extending flanges 9 at their side edges, which correspond in width with the thickness of the vertical sides of the honey boxes or sections, and cover the side edges thereof and hence prevent the honey boxes or sections from being gummed to the ends of the frame. The upper ends of the end members 7 of the frame extend above the top of the honey boxes or sections as at 11 and are each provided with a slot 12.

The top bar 13 of the frame is also made of sheet metal and comprises a pair of members 14 each of which is provided at its side edges with flanges 15 which serve to cover the side edges of the top of the honey boxes or frames, as shown, and hence prevent the gumming of said top bar sections to the honey boxes. Each member 14 is provided at its outer ends with a tongue 16 which is adapted to be engaged through one of the slots 11 so that the outer ends of the section 14 are detachably locked to the upper ends of the end members 7 of the frame. The length of the top bar members 14 is such that said members meet at their inner ends at the joints between the central honey boxes or sections. Each member 14 is formed near its inner end and on its upper side with a transversely arranged loop 18. In practice these loops are stamped integrally from the members 14. I also provide a locking bolt or strip 19 which is made preferably of sheet metal and which is passed through the loop and extends across the joints between the inner ends of said members 14 so that said members are locked together at their inner ends and stiffened and supported at the joints between them.

In order to remove one or more of the honey boxes or sections from the frame the locking bolt or strip must be slipped out of engagement with the loop of one of the top bar members, to disconnect the inner ends of the top bar members from each other. The top bar members can then be entirely removed, by detaching their locking tongue from the slots of the ends of the frame, and the desired honey box or honey boxes can then be readily drawn upwardly and removed from the frame and without disturbing the others.

Owing to the fact that my improved frame prevents the honey boxes or sections from being gummed thereto, it will be noted that the honey boxes or sections need not be subjected to any strain or stress while removing the same from the frame and hence the boxes or sections can be comparatively weak. This enables me to use honey boxes or sections which are made of sanitary pasteboard and which are very much less expensive than the bass wood honey boxes or sections now in common use. A feature of my invention is the construction of a honey box or section made of paste-board, and I would have it understood that other suitable and comparatively weak material can also be used for this purpose within the scope of my invention.

While I have herein shown and described a preferred form of my invention I would have it understood that changes may be made in the form, proportion and construction of the several parts without departing from the spirit of my invention and within the scope of the appended claims.

Having thus described my invention I claim:

1. In a honey box frame or holder of the class described, a bottom member, end members secured to the bottom member and each provided with a slot near its upper end, a top member comprising a pair of detachable sections, each of said sections having a tongue at its outer end to engage in one of said slots, said sections being also provided with guide loops near their inner ends, and a locking bolt or strip arranged for movement through said loop to extend across the joints between said sections and detachably lock said sections together at their inner ends.

2. In a honey box frame or holder of the class described, a bottom member, end members secured to the bottom member and each provided with a slot near its upper end, a top member comprising a pair of detachable sections, each of said sections having a tongue at its outer end to engage in one of said slots, said sections being also provided with guide loops near their inner ends, and a locking bolt or strip arranged for movement through said loop to extend across the joints between said sections and detachably lock said sections together at their inner ends, said loops being integral with and stuck up from said sections.

In testimony that I claim the foregoing as my own I have hereto affixed my signature in the presence of two witnesses.

JAMES H. McKAY.

Witnesses:
C. A. ISAACS,
E. S. DICKSON.

Copies of this patent may be obtained for five cents each, by addressing the "Commissioner of Patents, Washington, D. C."